(12) United States Patent
Hecht (10) Patent No.: US 11,241,747 B2
(45) Date of Patent: Feb. 8, 2022

(54) CUTTING TOOL AND UNDERSIZED BORE-LESS INDEXABLE INSERT THEREFOR

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/106,310

(22) Filed: Aug. 21, 2018

(65) Prior Publication Data

US 2019/0111494 A1 Apr. 18, 2019

Related U.S. Application Data

(60) Provisional application No. 62/572,611, filed on Oct. 16, 2017.

(51) Int. Cl.
*B23C 5/22* (2006.01)

(52) U.S. Cl.
CPC .... *B23C 5/2247* (2013.01); *B23B 2200/0495* (2013.01); *B23C 2200/0477* (2013.01); *B23C 2200/082* (2013.01); *B23C 2210/163* (2013.01)

(58) Field of Classification Search
CPC ... B23C 5/2247; B23C 5/2243; B23C 5/2239; B23C 5/207; B23C 5/2273; B23C 5/2269; B23C 5/2265; B23C 5/109; B23C 2200/0477; B23C 2200/0483; B23C 2200/081; B23C 2200/165; B23C 2200/168; B23C 5/2256; B23C 5/2252; B23C 5/226; B23C 2200/085; B23B 27/1625; B23B 27/1637; B23B 27/1666; B23B 2200/049; B23B 2200/0495; B23B 2200/081; B23B 2200/085
See application file for complete search history.

(56) References Cited

U.S. PATENT DOCUMENTS

| | | | | |
|---|---|---|---|---|
| 3,805,349 A | * | 4/1974 | Nose | B23C 5/202 407/114 |
| 4,297,058 A | * | 10/1981 | Armbrust | B23B 27/145 407/113 |
| 4,596,166 A | * | 6/1986 | Lindsay | B23C 5/2243 29/464 |
| 4,687,383 A | * | 8/1987 | Shimomura | B23C 5/207 407/113 |

(Continued)

FOREIGN PATENT DOCUMENTS

| | | | |
|---|---|---|---|
| CH | 652063 A5 | * 10/1985 | ......... B23B 27/1625 |
| DE | 2553298 A1 | * 6/1977 | ............. B23B 27/00 |

(Continued)

OTHER PUBLICATIONS

International Search Report dated Dec. 19, 2018, issued in PCT counterpart application (No. PCT/IL2018/051036).

(Continued)

*Primary Examiner* — Ryan Rufo
(74) *Attorney, Agent, or Firm* — Womble Bond Dickinson (US) LLP (57) ABSTRACT

An undersized indexable cutting insert being devoid of a through bore and has exactly three main cutting edges. The cutting insert has an inscribed circle which tangentially contacts only and all main cutting edges, and has an inscribed circle diameter of under 3.8 millimeters.

34 Claims, 4 Drawing Sheets

(56) References Cited

U.S. PATENT DOCUMENTS

| | | | |
|---|---|---|---|
| 5,032,049 A | | 7/1991 | Hessman et al. |
| 5,437,522 A | * | 8/1995 | Satran ................... B23C 5/2213 407/114 |
| 5,597,270 A | * | 1/1997 | Marin ..................... B23C 5/202 407/102 |
| 6,116,824 A | * | 9/2000 | Strand ................... B23C 5/2213 407/114 |
| 6,168,356 B1 | * | 1/2001 | Sjoo ....................... B23B 27/065 407/104 |
| 6,196,771 B1 | | 3/2001 | Andersson |
| 7,118,312 B2 | | 10/2006 | Norström et al. |
| 8,690,495 B2 | * | 4/2014 | Choi ...................... B23C 5/2273 407/107 |
| 2002/0028116 A1 | * | 3/2002 | Morgulis ................ B23C 5/202 407/67 |
| 2002/0098047 A1 | * | 7/2002 | Norris .................... B23C 5/1072 407/35 |
| 2004/0213639 A1 | | 10/2004 | Ueda et al. |
| 2004/0234349 A1 | | 11/2004 | Ueda et al. |
| 2005/0019112 A1 | * | 1/2005 | Erickson .............. B23B 27/1614 407/113 |
| 2005/0129470 A1 | * | 6/2005 | Bellinger .............. B23C 5/2243 407/40 |
| 2005/0271483 A1 | | 12/2005 | Sjogren |
| 2007/0077130 A1 | | 4/2007 | Ley |
| 2007/0189861 A1 | * | 8/2007 | Muren ................... B23B 27/007 407/113 |
| 2007/0245535 A1 | * | 10/2007 | Noggle ................... B23C 5/202 29/428 |
| 2007/0297865 A1 | | 12/2007 | Hessman |
| 2010/0266354 A1 | | 10/2010 | Zitzlaff et al. |
| 2011/0020077 A1 | * | 1/2011 | Fouquer ................. B23C 5/109 407/11 |
| 2012/0087748 A1 | * | 4/2012 | Uno ......................... B23C 5/06 407/42 |
| 2012/0170988 A1 | * | 7/2012 | Kountanya ........... B23B 27/141 407/119 |
| 2013/0129430 A1 | * | 5/2013 | Bhagath ................. B23C 5/207 407/33 |
| 2013/0142581 A1 | * | 6/2013 | Volokh ................... B23C 5/207 407/114 |
| 2014/0030038 A1 | * | 1/2014 | Hansson ............... B23C 5/2221 408/199 |
| 2014/0212235 A1 | * | 7/2014 | Prast ..................... B23B 27/145 408/231 |
| 2014/0234041 A1 | * | 8/2014 | Ben Amor .......... B23B 27/1651 407/107 |
| 2015/0125226 A1 | | 5/2015 | Yano et al. |
| 2015/0158091 A1 | | 6/2015 | Hecht |
| 2015/0202697 A1 | * | 7/2015 | Shiota .................... B23C 5/109 407/42 |
| 2016/0354849 A1 | | 12/2016 | Hacker et al. |

FOREIGN PATENT DOCUMENTS

| | | | | |
|---|---|---|---|---|
| DE | 3506415 A1 | | 9/1986 | |
| EP | 0130268 A1 | * | 1/1985 | ........... B23C 5/2295 |
| JP | 06182605 A | * | 7/1994 | ........... B23B 27/164 |
| JP | 11156607 A | * | 6/1999 | |

OTHER PUBLICATIONS

Written Opinion dated Dec. 19, 2018, issued in PCT counterpart application (No. PCT/IL2018/051036).

* cited by examiner

CUTTING TOOL AND UNDERSIZED BORE-LESS INDEXABLE INSERT THEREFOR

RELATED APPLICATIONS

The present application claims priority to U.S. Provisional Application No. 62/572,611 filed Oct. 16, 2017. The contents of the aforementioned provisional application are incorporated by reference in their entirety.

FIELD OF THE INVENTION

The subject matter of the present application relates to machining or cutting tools. Specifically, it relates to micro cutting tools with undersized indexable cutting inserts which are devoid of a through clamping bore.

BACKGROUND OF THE INVENTION

Generally speaking, replaceable/expendable inserts secured in a reusable steel body are more cost-effective, and therefore preferred, in comparison to one-piece cutting tools where the tool body has built-in sharp cutting edges. One-piece tools have been dominant at a low end of the tool-size/diameter scale. Specifically, this is true under a certain insert size, where it becomes impractical (or even impossible) to utilize replaceable inserts because they cannot be secured in a pocket via a fastener which passes through a clamping bore in the insert. The main reason for this is that under a certain size, the clamping screws (and specifically the heads thereof) become too small for standard drivers or wrenches. Therefore, there has been a long-felt need for cutting tools with replaceable cutting insert/s for at least a portion of the smaller-diameter cutting tools market.

SUMMARY OF THE INVENTION

In accordance with a first aspect of the subject matter of the present application there is provided an undersized indexable cutting insert being devoid of a through bore; the cutting insert includes exactly three main cutting edges and has an inscribed circle which tangentially contacts only and all main cutting edges.

In accordance with a second aspect of the subject matter of the present application there is provided a positioning tool configured to hold and/or retain an undersized, bore-less indexable cutting insert, the positioning tool comprising an outwardly facing insert holding surface having an elongated shape, wherein, the shape of the insert holding surface corresponds to a shape of a side of the cutting insert.

In accordance with a third aspect of the subject matter of the present application there is further provided a tool kit which includes the positioning tool and an undersized, bore-less cutting insert.

In accordance with a fourth aspect of the subject matter of the present application there is further provided a tool kit which includes a cutting tool having an insert pocket, an undersized, bore-less indexable cutting insert externally secured in the pocket via a clamping screw and the positioning tool.

In accordance with a fifth aspect of the subject matter of the present application there is further provided a method of replacing an undersized insert (usually because all cutting edges have become worn) with the positioning tool can include the following steps:

a. Attaching the insert holding surface to any part of the undersized insert;

b. Unfastening the screw to unclamp, or release, the undersized insert;

c. Pulling the insert out of the pocket, detaching the insert from the insert holding surface and discarding it;

d. Attaching the insert holding surface to a non-used relief surface of a replacement cutting insert.

e. Inserting the replacement insert into the pocket and fastening the screw.

In accordance with a sixth aspect of the subject matter of the present application there is further provided a method of indexing an undersized insert (usually due to a worn cutting edge) with the positioning tool can include the following steps:

a. Attaching the holding surface to an exposed, or accessible, main relief surface associated with an operative, usually worn, main cutting edge;

b. unscrewing the screw to unclamp, or release, the undersized insert;

c. attaching the tool to the insert;

d. removing the insert from the pocket and indexing it such that a non-used main relief surface is attached to the insert holding surface;

e. Inserting the undersized insert 14 into the pocket 18 and fastening the screw.

Any of the following features, either alone or in combination, may be applicable to any of the above aspects of the subject matter of the application:

The positioning tool may have a magnetic or magnetized insert holding surface which is configured to magnetically retain the insert. In some embodiments, the positioning tool may comprise a natural magnet while in other embodiments the positioning tool may comprise an electromagnet.

The positioning tool may have an electrostatic insert holding surface which is configured to electrostatically retain the insert.

The positioning tool may have a sticky insert holding surface to which the insert may temporarily adhere, upon contact.

The insert holding surface is elongated in an elongation direction and the positioning tool can further include opposite, enlarged gripping surfaces which extend in the elongation direction (ED) and are configured to provide grip and orientation indication when an operator holds the positioning tool.

The insert holding surface can have two opposite major edges extending in the elongation direction and two, shorter, minor edges extending between the major edges.

The tool body is elongated in an axial direction extending away from the positioning head, and the insert holding surface is the outward-most surface which protrudes axially outwardly from the positioning head.

The undersized insert is triangular or trigonal, and the insert holding surface is configured to engage one of three main relief surfaces of the undersized insert.

The insert holding surface can include opposite identical major edges which range between 1.8 and 4.2 mm.

The insert holding surface has opposite minor edges which connect the opposite major edges and range between 1.1 and 2.4 mm.

The positioning tool can be modular, and the rear tool end of the tool body can be configured to be selectively attached to and detached from, a driving tool.

The positioning tool can have an elastic sleeve rigidly connected to the positioning head.

The tool body is elongated in an axial direction extending away from the positioning head; the insert holding surface is elongated in an elongation direction; and in a view along the axial direction, the insert holding surface has a smaller footprint than a footprint of the tool body.

The positioning head can include two head surfaces which extend and diverge, rearwardly away from the insert holding surface.

The positioning tool can further include a non-ferromagnetic, non-magnetic holding portion rigidly connected to the tool body, and configured for enabling grip and applying torque transfer.

The cutting insert has only three main cutting edges and an inscribed circle which tangentially contacts all three main cutting edges.

The inscribed circle can an inscribed circle diameter which ranges between 2.5 mm and 3.8 mm.

The inscribed circle can have an inscribed circle diameter which ranges between 2.5 mm and 3.2 mm.

A shape of the insert holding surface corresponds to a shape of a main relief surface of the cutting insert.

The cutting insert includes:

opposite insert top and bottom surfaces and an insert peripheral surface which extends therebetween;

a symmetry central axis passing through the top and bottom surfaces; and a maximum insert thickness, measured along the symmetry central axis, and ranging between 1 mm and 2.5 mm.

The cutting tool can include a fluid channel which opens out to the at least one insert pocket at a fluid outlet.

The cutting insert can have a main cutting edge having a main cutting edge length which ranges between 2 mm and 4 mm.

The cutting insert can include a deflector which extends from a main rake surface and is configured to deflect chips.

The cutting insert includes a symmetry central axis passing through the top and bottom surfaces, around which the cutting insert has 120 degree rotational symmetry.

The cutting insert is single sided and comprises opposite insert top and bottom surfaces. And the insert bottom surface has a bottom edge which is not configured for machining and does not include cutting edges.

The cutting insert is not made of PCD or PCB.

The cutting insert can be pressed-to-size and no portion or surface thereof is ground.

BRIEF DESCRIPTION OF THE DRAWINGS

For a better understanding of the subject matter of the present application and to show how the same may be carried out in practice, reference will now be made to the accompanying drawings, in which.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
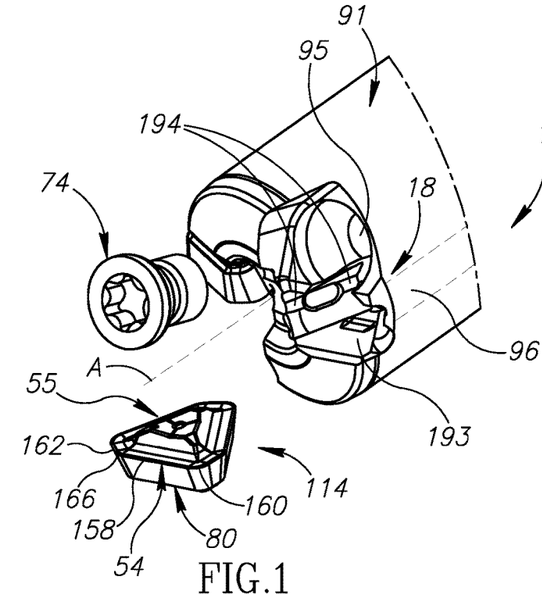
FIG. 1 is an isometric semi-exploded view of a first embodiment of a cutting tool with two undersized cutting inserts.
Figure 2:
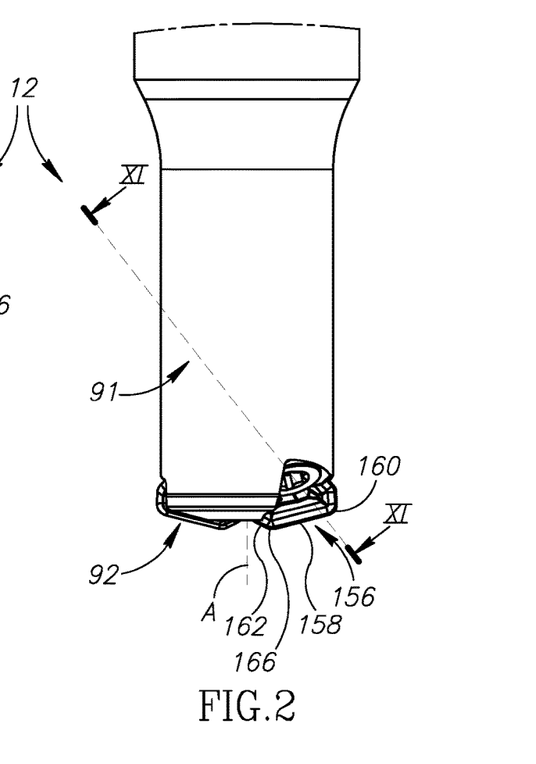
FIG. 2 is a side view of the cutting tool of FIG. 1.
Figure 3:
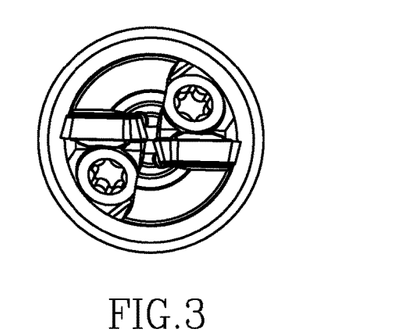
FIG. 3 is a bottom axial view of the cutting tool of FIG. 1.
Figure 7:
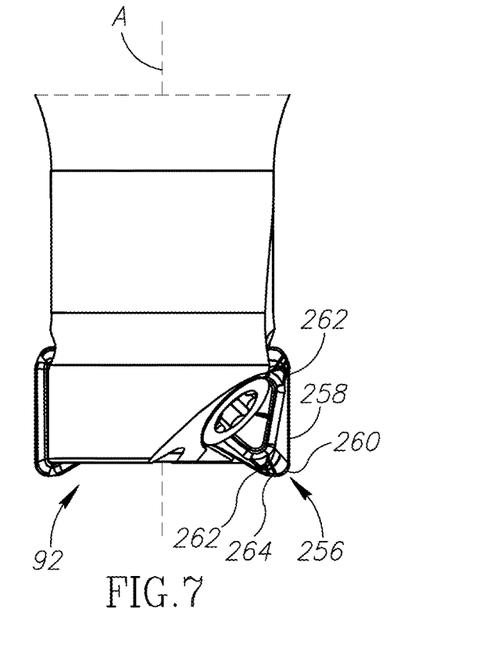
FIG. 7 is a side view of the cutting tool of FIG. 6.
Figure 8:
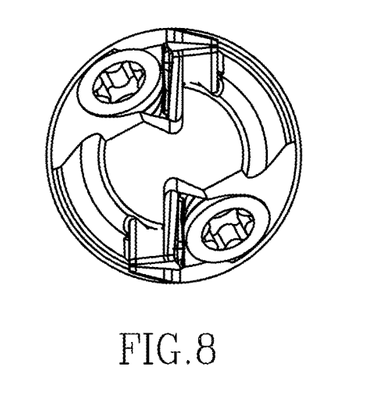
FIG. 8 is a bottom axial view of the cutting tool of FIG. 6.

Attention is drawn to FIGS. 1 and 7. A machining or cutting tool 12 includes one or more undersized, bore-less indexable cutting inserts 14 secured in a pocket 18 of the cutting tool 12.

The undersized insert 14 is indexable, bore-less, positive and triangular or trigonal. The cutting tool 12 has a longitudinal rotation axis A.

The word 'undersized' is used in a sense that describes cutting inserts 14 which are smaller than currently available replaceable 'one-piece' (i.e., not brazed, or made of two or more major portions) inserts. Stated differently, these undersized inserts 14 are so small, that they may become engulfed, or even disappear, between two fingertips.

For present purposes, an insert is said to be "undersized" if it meets one or more predetermined size and geometry criteria, as will be further explained below.

The cutting tool 12 can be optionally provided with a positioning tool 16 (FIGS. 12-15). Indexing, installing or replacing these undersized inserts 14 can be done by hand, and optionally, with the positioning tool 16. These tasks can also be performed using the positioning tool 16 in combination with two fingers as will be further explained below.

The positioning tool 16 is configured to hold the undersized inserts 14, such that the cutting edges are visible (as opposed to holding the inserts 14 by hand, possibly causing the cutting edges to become invisible). Furthermore, the positioning tool 16 is configured to hold the insert 14 in a specific orientation, for accurately securing and positioning of the insert 14 in the pocket 18 and for accurately identifying worn cutting edges. For example, if a cutting edge becomes worn, the operator will retain the insert 14 via the relief surface associated with the insert's 14 worn cutting edge with the positioning tool 16, take the insert 14 out of the pocket 18, change the insert's 14 orientation with respect to the positioning tool 16, and then put the insert 14 back in the pocket 18 in the desired orientation (i.e., unused cutting edge facing outwardly).

According to one embodiment of the subject matter of the present application, the positioning tool 16 is therefore provided as a part of a tool kit 10 which includes the positioning tool 16, the cutting tool 12 and one or more undersized inserts 14. According to another embodiment, the tool kit 10 includes only the positioning tool 16 and the undersized inserts 14.

Attention is drawn to FIGS. 12-15. The positioning tool 16 has opposite front and rear tool ends 20, 22. At the front tool end 20, the positioning tool 16 has a positioning head 24 which has a unitary, one-piece construction. At the rear tool end 22, the positioning tool 16 includes a tool body 26 which is rigidly and permanently attached to the positioning head 24. The tool body 26 can be made of plastic, or a suitable non-magnetized, non-ferromagnetic material.

The positioning head 24 has an elongated, preferably cylindrical shape. The positioning head 24 has an insert holding surface 28 which is located at the front tool end 20 and faces axially outwardly.

For present purposes, an "insert holding surface" is one which retains an undersized insert by applying an attractive force to surfaces of the insert 14. The insert holding surface 28 relies on attractive forces such as a magnetic force or an electrostatic force, to retain the insert 14. Alternatively, the insert holding surface can be a sticky surface which temporary adheres to the insert 14 on contact.

The insert holding surface 28 protrudes axially outwardly from the positioning head 24. In other words, the insert holding surface 28 is the outer-most portion of the positioning head 24 in an axial direction thereof. This is advantageous to better hold the insert 14, with no interference, and, to better define and view its orientation. The insert holding surface 28 is configured to engage and hold the undersized inserts 14. Therefore, the insert holding surface 28 has an asymmetric shape which is configured to match, or correspond to, a shape of a side, or a peripheral side, of the undersized inset 14 (generally, most inserts have elongated sides, or peripheral sides). Specifically, at least in a plan view of a relief surface of an insert (this, contrary to a view of a rake surface of an insert, where symmetric shapes are rather common), the insert has an elongated shape.

In a preferred embodiment, further described below, the attractive force is magnetic. Accordingly, the positioning tool 16 is a magnetic positioning tool 16 having a positioning head 24 provided with a magnetic insert holding surface 28. In such an embodiment, the head 24 and insert holding surface 28 generate magnetic fields, either being formed from a naturally magnetic material, or a ferromagnetic material. Additionally, in some embodiments, the magnetic positioning tool 16 may comprise an electromagnet.

Figure 14:
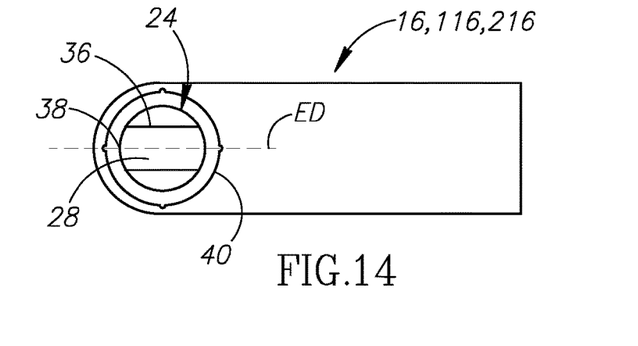
FIG. 14 is an axial front view of the second positioning tool embodiment of FIG. 13.

Attention is drawn to FIG. 14. In a plan view, the magnetic insert holding surface 28 has a peripheral edge which has a closed, elongated shape, which defines an elongation direction ED. In other words, in a first direction (elongation direction ED), the shape of the magnetic insert holding surface 28 has a maximum dimension which is larger than a maximum dimension in a second direction, perpendicular to the elongation direction ED. The shape of the magnetic insert holding surface 28 corresponds to, or matches a side of the undersized inserts 14. Specifically, in an attached position (when the magnetic insert holding surface 28 is in contact a side of the undersized inset) the undersized insert 14 is aligned with, and corresponds to, the elongation direction ED (as seen in FIG. 14) due to the attractive forces. The word 'corresponds' is used in the sense that indicates similarities in geometry (e.g., if one shape is a rectangle, the corresponding shape will not be round) between the shape of the magnetic insert holding surface 28, and the shape of a side of the undersized insert 14. This is advantageous, since when the magnetic insert holding surface 28 is brought close enough to any side, or side peripheral surface, or relief surface 82, of the undersized insert 14, magnetic pulling forces (mostly within boundaries of the magnetic insert holding surface 28) can alter the insert's 14 orientation to match, or correspond to that of the magnetic insert holding surface 28.

Furthermore, the magnetic positioning tool 16 includes a holding portion 30 which includes opposite gripping surfaces 32 which provide the operator grip and enable easy application of torque onto the magnetic positioning tool 16. The holding portion 30 is located rearwardly away from the magnetic insert holding surface 28. The opposite gripping surfaces 32 extend in the elongation direction ED. The gripping surfaces 32 can be parallel to the elongation direction ED. This feature is advantageous, since the operator can easily establish, or readily deduce, the orientation of the magnetic insert holding surface 28, and subsequently— the orientation of the undersized insert 14.

The magnetic insert holding surface 28 has the same, or smaller area when compared to an axial cross section of the positioning head 24. In other words, the magnetic insert holding surface 28 has the smallest footprint of the magnetic positioning tool 16 in an axial view thereof, or in a plan view of the magnetic insert holding surface 28.

Attention is again drawn to FIG. 14. For example, the magnetic insert holding surface 28 can have a generally rectangular shape with a pair of opposite major edges 36 which extend in the elongation direction ED and a pair of opposite minor edges 38 (which can be non-straight). The positioning head 24 can include head surfaces 34, each of which extends from a respective major edge 36. The head surfaces 34 diverge away from the magnetic insert holding surface 28. The head surfaces 34 can be planar, and are configured to assist the operator with establishing the correct orientation and indexing position of the current magnetically held miniature insert 14 (especially when the operator is indexing the insert 14).

Figures 12, 13:
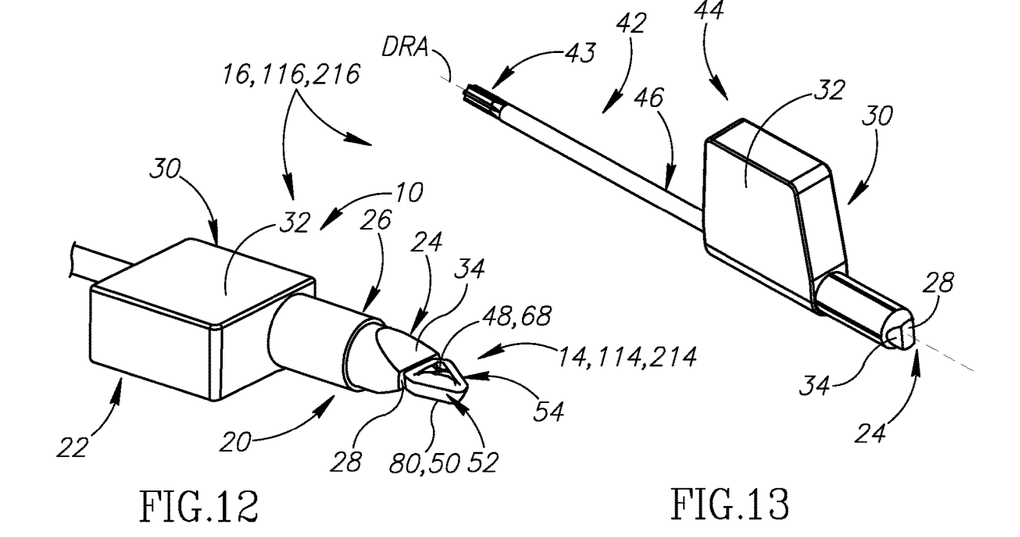
FIG. 12 is an isometric view of a tool kit which includes the undersized insert and a modular first positioning tool embodiment mounted onto a driver.
FIG. 13 is an isometric view of a second positioning tool embodiment integrated with a driver.
Figure 15:
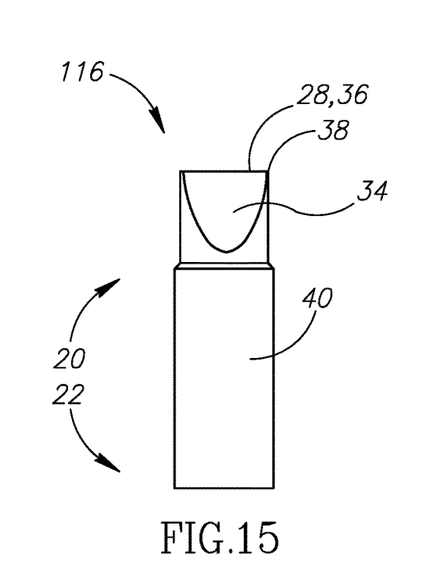
FIG. 15 is a standalone side view of the first positioning tool embodiment of FIG. 12.

According to the subject matter of the present application, the magnetic positioning tool 16 can have three magnetic positioning tool embodiments:

Attention is drawn to FIGS. 12 and 15. According to a first magnetic positioning tool embodiment, the magnetic positioning tool 116 is modular, and can be rigidly attached/reattached to most drivers 42 or tools. Specifically, the rear tool end 22 is configured to be attached, or clamped, onto/into a driver rear end 44 (non-driving end). For example, the rear tool end 22 can include a non-magnetic, non-ferromagnetic coupling portion, or sleeve 40, which is configured to couple or attach the magnetic tool 116 onto another tool, such, e.g., a driver 42.

Attention is drawn to FIGS. 13 and 14. According to a second magnetic positioning tool embodiment, the magnetic positioning tool 216 has a positioning head 24 which is an integral part of the driver 42, and specifically, of the driver rear end 44 (i.e., non-driving end thereof). The magnetic tool 216 can be, e.g., adhered, forced into a dedicated recess or screw threaded into or onto the driver rear end 44.

Figure 16:
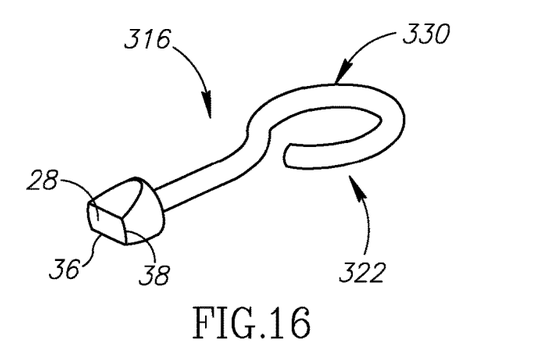
FIG. 16 is a third positioning tool embodiment without driving means.

Attention is drawn to FIG. 16. According to a third magnetic positioning tool embodiment, the magnetic positioning tool 316 is a stand-alone tool, which is configured only to assist the operator in positioning, holding and indexing the insert 14 as disclosed above. According to this embodiment, the magnetic tool 316 does not include any driving means such as a Torx interface/key. The magnetic positioning tool 316 includes a holding portion 330 at the rear tool end 322.

The undersized insert 14 is typically made from extremely hard and wear-resistant material such as cemented carbide by form-pressing and sintering carbide powders in a binder. The cemented carbide may be, for example, tungsten carbide. The cutting insert 14 may be coated or uncoated. The undersized inserts 14 are preferably not made of PCD (Polycrystalline Diamond) or PCB (Polycrystalline Boron). The undersized inserts 14 are preferably non-demagnetized. However, during tests, the magnetic positioning tool 16 functioned adequately, and properly held even inserts which were demagnetized.

The insert 14 is preferably pressed-to-size. In other words, no portion or surface of the insert 14 is ground. This is a substantial advantage in terms of production efficiency and cost-effectiveness. Furthermore, besides the inherently-costly grinding process, further costs are incurred when grinding these undersized 'nano' inserts as compared to larger inserts. Due to the problematic insert size, even if they are developed, it was found that machinery capable of holding these inserts to be ground are likely to be considerably more expensive and prone to reliability issues.

The undersized insert 14 has opposite insert top and bottom surfaces 48, 50 and an insert peripheral surface 52 which extends therebetween. The insert 14 has a 120-degree rotational symmetry about a symmetry central axis CA which passes through the insert top and bottom surfaces 48, 50. Thus, the insert 14 is three-way indexable about its symmetry central axis CA. The insert 14 has a virtual mid-plane MP which is perpendicular to the central axis CA, located midway between the insert top and bottom surfaces 48, 50 and intersects the insert peripheral surface 52. A maximum insert thickness MIT is measured in a direction parallel to the central axis CA, between outward extremities of the insert top and bottom surfaces 48, 50. The maximum insert thickness MIT preferably ranges between 1.0 and 2.5 millimeters.

Figure 4:
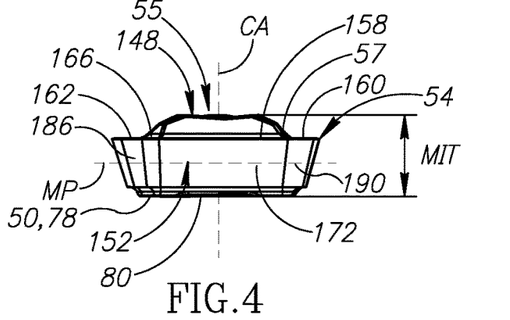
FIG. 4 is a side view of the undersized insert of FIG. 1.
Figure 9:
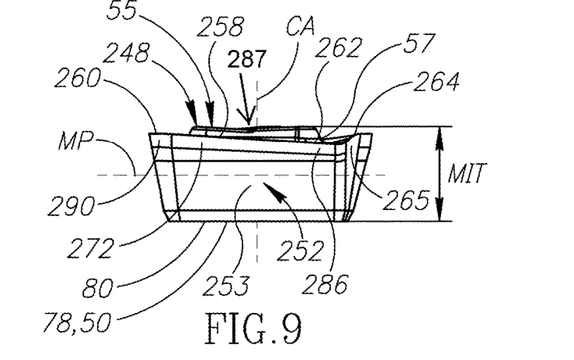
FIG. 9 is a side view of the undersized insert of FIG. 6.

The insert top surface 48 has a peripheral top edge 54. The top edge 54 includes exactly three operative portions 56 configured for operating on a workpiece. As will be further disclosed below, each operative portion 56 can include, e.g., a main cutting edge 58, a corner cutting edge 60 and/or a ramping cutting edge 62. Each operative portion 56 can also include wiper edges 64, which are not configured for removing material, but rather for smoothening, or improving the surface quality of the workpiece. The insert top surface 48 can include at least one three-sided abutment protrusion 55 which protrudes beyond the top edge 54 in a side view of the insert 14 (FIGS. 4 and 9). The abutment protrusion 55 extends outwardly further than any other portion of the insert top surface 48 with respect to the mid-plane MP. Each abutment protrusion 55 includes a deflecting surface, or deflector 57 on each of its sides.

Each main cutting edge 58 can have a main cutting edge length CEL which ranges between 2 and 4 mm.

Figure 5:
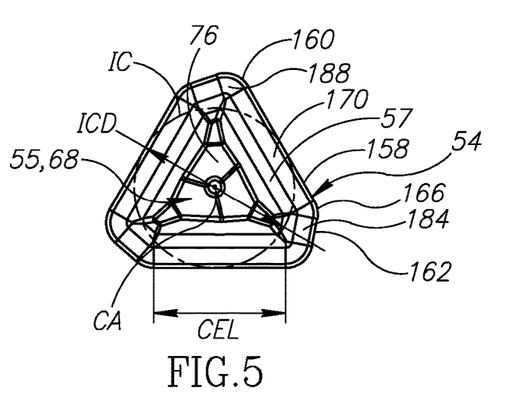
FIG. 5 is a top plan view of a top surface of the undersized insert of FIG. 1.
Figure 10:
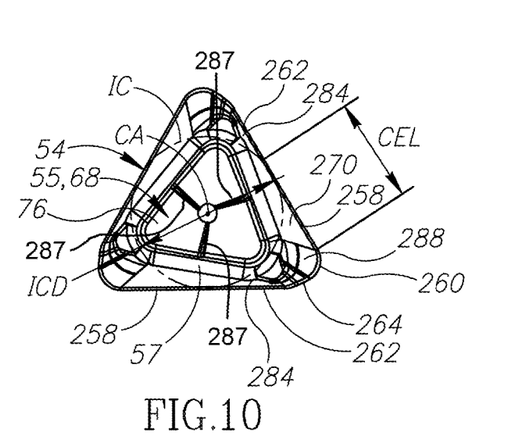
FIG. 10 is a top plan view of a top surface of the undersized insert of FIG. 6.

The insert top surface 48 includes a top abutment surface 68 configured for abutting engagement with a screw 74 for securing the insert 14 in the insert pocket 18. The top abutment surface 68 includes exactly three top abutment sub-surfaces 76 configured for engagement with the screw 74. Together, the top abutment sub-surfaces 76 define a perimeter of the top abutment surface 68. As seen in the plan view of FIG. 10, one or more of the top abutment sub-surfaces 76 can have a non-triangular shape. As seen from FIGS. 9 and 10, the top abutment surface 68 can be non-planar, with its three top abutment sub-surfaces 76 sloped in the same circumferential direction ("circumferentially sloped") relative to the symmetry central axis CA and separated from one another by a radially extending step discontinuity 287, the step discontinuity being characterized by a difference in height of opposing radially extending edges belonging to circumferentially adjacent top abutment sub-surfaces 76. The top abutment surface 68 can have a triangular shape in a top view thereof (FIGS. 5 and 10). In the top view, the orientation of the top abutment surface 68 can be rotated about the central axis CA with respect to the insert top surface 48 depending on the orientation of the screw 74 with respect to the orientation of the insert 14, and in turn, the orientation of the insert 14 with respect to the cutting tool 12 (e.g., as seen in FIG. 10).

The insert top surface 48 includes main rake surfaces 70. Each main rake surfaces 70 can be located between the top edge 54 and the abutment protrusion 55. Each main rake surface 70 extends from a respective main cutting edge 58 and can merge with a respective deflector 57 on the abutment protrusion 55. As seen in FIGS. 4 and 5, the deflector 57 can extend from the main rake surface onto a side of the abutment protrusion 55. In other words, each deflector 57 is located farther from the central axis CA than the respective rake surface 70, and located closer to the mid-plane MP than the top abutment surface 68.

Attention is drawn to FIGS. 5 and 10. According to the present embodiments, in a top, or plan view of the insert top surface 48 the insert 14 can have, e.g., a non-regular trigon, or a regular triangular shape. An inscribed circle IC is defined between (or tangent to) three identical main cutting edges 58 of the top edge 54. The inscribed circle IC has an inscribed circle diameter ICD which ranges between 2.5 and 3.8 millimeters and preferably is between 2.5 and 3.2.

The abovementioned inscribed circle diameter ICD range leaves no room for a proper, functional clamping bore (i.e., capable of accommodating a proper/usable screw with a usable screw head size), while also maintaining an adequate insert structure. In other words, inserts that small, can become too weak and unusable, and/or the clamping bore will only accommodate screws that are too small and unsuitable for securing cutting inserts in pockets. Consequently, these inserts 14 are devoid of a clamping bore, and any other through aperture, and thus are regarded as being "bore-less". Not having a clamping bore is advantageous at least because the insert is more robust, and manufacturing process is cheaper compared to an insert with a bore (pressing the powder requires no extra punch for creating the through clamping bore).

The insert bottom surface 50 includes a bottom abutment surface 78. The bottom abutment surface 78 is preferably planar. The insert bottom surface 50 has a bottom edge 80, which can lie in a single plane. The bottom edge 80 is not configured for any type of machining or cutting. The insert 14 is therefore single-sided, or one-sided. The insert bottom surface 50 can include a recess located centrally in the bottom abutment surface 78, which can improve engagement definition (3-points engagement as known in the field) between the bottom abutment surface 78 and a respective abutment surface in the pocket 18.

The insert peripheral surface 52 extends from the top edge 54 and converges (with increasing proximity to the central axis CA) towards the bottom edge 80. Furthermore, in a top, plan view of the insert top surface 48 (FIGS. 5 and 10), no part of the bottom edge 80 is visible. The insert 14 is therefore defined, as known in the field as a positive insert 14, or as an insert which has a positive cutting geometry. As such, and as seen in FIGS. 1, 4 and 5, the bottom surface of the undersized, single-sided cutting insert has a smaller footprint than the top surface. These undersized inserts have a positive cutting geometry which is simpler to manufacture and press, especially since these inserts have presses-to-size geometries and cutting edges.

It is noted, therefore, that an undersized insert 14 may have top and/or bottom surfaces provided with recesses, depressions and other formations, yet still be considered "bore-less", as long as it lacks a through-going bore to permit a clamping element to pass therethrough and secure the insert to a pocket.

Attention is drawn to FIGS. 1-5. According to a first insert embodiment, the undersized insert 14 is a high feed cutting insert 114 as known in the field. Each operative portion 156 includes a ramping cutting edge 162 connected transversely (in a plan view of the insert top surface 148 as seen in FIG. 5) to a main cutting edge 158 which is connected to a corner cutting edge 160. The operative portion 156 can include a minor corner cutting edge 166 which connects the ramping cutting edge 162 with the main cutting edge 158. Each ramping cutting edge 162 is formed at an intersection between a ramping rake surface 184 and a ramping relief surface 186. Each main cutting edge 158 is formed at an intersection between a main rake surface 170 and a main relief surface 172. The main relief surface 172 is preferably planar, and also configured for abutment with the insert holding surface 28 of the magnetic positioning tool 16 and respective walls of the pocket as will be explained below. Each corner cutting edge 160 is formed at an intersection between a corner rake surface 188 and a corner relief surface 190. Each of the rake surfaces is formed on the insert top surface 148. Each of the relief surfaces is formed on the insert peripheral surface 152.

According to the first insert embodiment, the main cutting edge length CEL equals 2.5 millimeters and the inscribed circle diameter ICD equals 3.0 millimeters.

Attention is drawn to FIG. 6-10. According to a second insert embodiment, the undersized insert 14 is a shouldering insert 214 as known in the field. The shouldering insert is configured to mill a right angle shoulder in the workpiece within tolerances of between 1 to 2 degrees. Each operative portion 256 includes a main cutting edge 258, a wiper edge 264 and a corner cutting edge 260 which extends therebetween. Each operative portion 256 can also include a ramping cutting edge 262 which extends between the wiper edge 264 and a main cutting edge 258 of an adjacent operative portion 256. In other words, the ramping cutting edge 262 of a first operative portion 256 is a part of, has the same orientation and continues, the main cutting edge 258 of an adjacent second operative portion 256. Therefore, if a deeper shoulder is required by some applications, an 'extended main cutting edge' 258 can be achieved simply by defining a larger depth of cut. In such cases, the operator can decide to use the entire combined length of the ramping cutting edge 262 of the first operative portion 256 and the main cutting edge 258 of the second operative portion 256 to achieve said extended main cutting edge 258. Each main cutting edge 258 is formed at an intersection between a main rake surface 270 and a main relief surface 272. Each ramping cutting edge 262 is formed at an intersection between a ramping rake surface 284 and a ramping relief surface 286. Each corner cutting edge 260 is formed at an intersection between a corner rake surface 288 and a corner relief surface 290. Each of the rake surfaces is formed on the insert top surface 248. Each of the relief surfaces is formed on the insert peripheral surface 252. The peripheral surface 252 further includes wiper relief surfaces 265, each of which extends from a respective wiper edge 264. The peripheral surface 252 further includes a side abutment surface 253 which extends between each main relief surface 272 towards the bottom edge 80.

According to the second insert embodiment, the main cutting edge length CEL equals 2.8 millimeters and the inscribed circle diameter ICD equals 2.8 millimeters.

Figure 6:
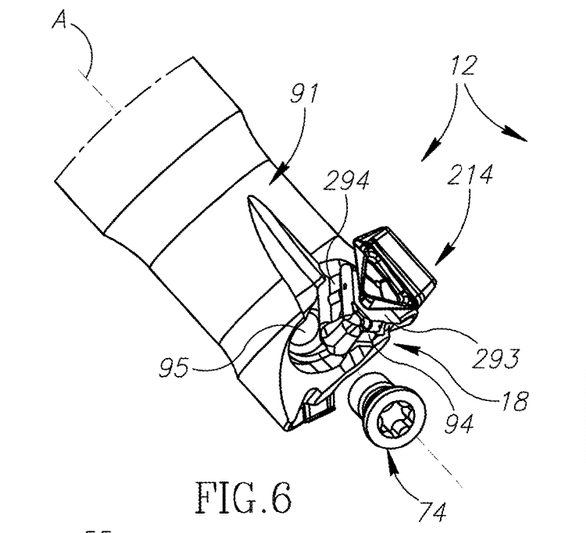
FIG. 6 is an isometric semi-exploded view of a second embodiment of a cutting tool with two undersized cutting inserts.

Attention is drawn to FIGS. 1 and 6. The cutting tool 12 has a cutting body 91 and a cutting portion 92 which extends therefrom and includes at least two pockets 18. The pocket 18, or pockets are what is known in the field as radially oriented, or radial, pockets 18. The inserts 14 are therefore also referred to radial inserts.

Each pocket 18 can have a pocket base surface 93 and two pocket walls 94 which extend therefrom. The pocket walls 94 can be perpendicular to the pocket base surface 93. According to the first insert embodiment, the two pocket walls 194 converge inwardly, in a direction generally parallel to the rotation axis A (as seen in FIG. 1). According to the second insert 214 embodiment, the two pocket walls 294 converge inwardly, in a direction perpendicular to the rotation axis A (as seen in FIG. 6).

Each pocket 18 includes a wedge-type arrangement which secures these undersized, bore-less inserts 14. The inserts 14 are not adhered, or brazed in any way to any other portions of the cutting tool 12 or adaptor/cartridges of any kind, to ensure a simple, fast and cost-effective replacement or indexing of the inserts 14 themselves (without any adaptors or shims). Each pocket 18 includes a screw 74 which is screw threaded into a threaded bore 95 in the cutting tool 12, without passing through the insert 14. The threaded bore 95 is not located in the pocket base surface 93. The screw 74 is configured to directly contact, and force the insert 14 against the pocket base surface 93 (i.e., the insert 14 is wedged therebetween). The screw 74 also pulls the insert 14 towards and against the pocket walls 94 that locate the insert 14 in the pocket 18. According to the first insert embodiment, at least one main relief surfaces 172 abuts a respective pocket wall 194. According to the second insert embodiment, at least one side abutment surface 253 abuts a respective pocket wall 294. When tightened, the screw 74 engages the top abutment surface 68, and specifically, the screw 74 abuts one of the top abutment sub-surfaces 76.

Figure 11:
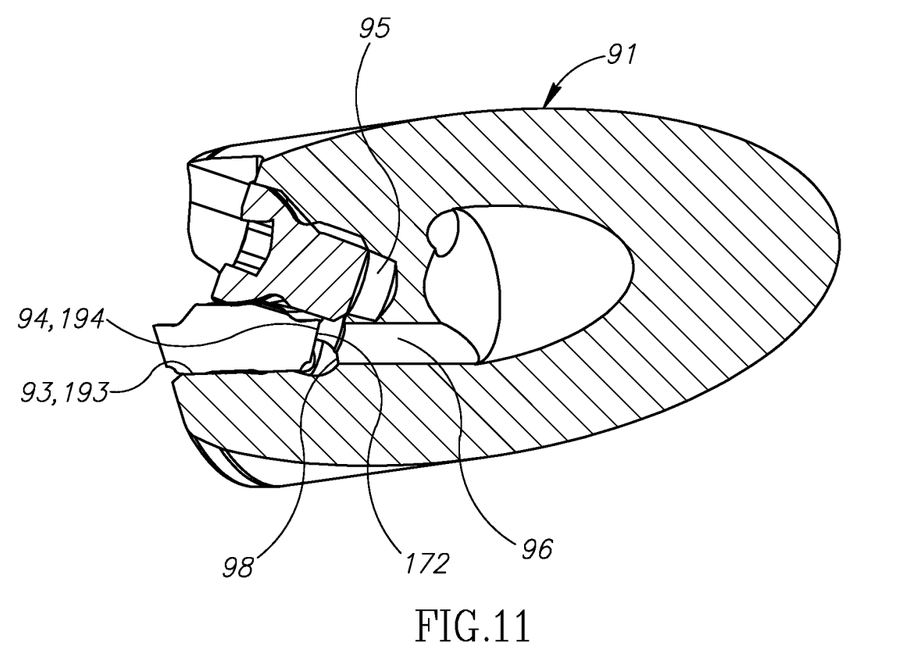
FIG. 11 is a cross-sectional view of a fluid channel taken along line XI-XI of FIG. 2.

Each pocket 18 can further include an internal fluid channel 96 which extends along the cutting body 91, and opens out to the pocket 18 at a fluid outlet 98. The fluid outlet can be located adjacent the threaded bore 95. The fluid channel 96 and the fluid outlet 98 are separate from the threaded bore 95. The fluid channel 96 can be located between two pocket walls 94.

Torque drivers are well known, and are sometimes supplied/recommended for use with the tools of the current field (i.e., miniature cutting tools which include tiny screws), since fasteners of said small diameter can rather easily become torn, or broken. These torque drivers include a torque limiting mechanism which is calibrated to prevent the operator from exceeding the recommended torque limit when applying torque to the respective screw size.

A standard/regular driver 42, or torque driver includes opposite driver front and rear ends 43, 44 and a driver body 46 which extends therebetween. The driver 42 has a driver rotation axis DRA. The driver front end 43 includes a key, or torque transferring geometry such as TORX™. The driver body 46 includes a driver holding portion 30 which is configured to provide grip. The driver holding portion 30 can extend radially outwardly away from the driver rotation axis DRA either in one, or two opposite sides thereof.

A method of replacing an undersized insert 14, 114, 214 (usually because all cutting edges have become worn) with the magnetic positioning tool 16, 116, 216, 316 can include the following steps:
 a. Attaching the insert holding surface 28 to any part of the undersized insert 14, 114, 214;
 b. Unfastening the screw 74 to unclamp, or release, the undersized insert 14, 114, 214;
 c. Pulling the insert 14, 114, 214 out of the pocket 18, detaching the insert 14, 114, 214 from the insert holding surface 28 and discarding it;
 d. Attaching the insert holding surface 28 to a non-used main relief surface 172, or side abutment surface 253 of a replacement cutting insert 14, 114, 214.
 e. Inserting the replacement insert 14, 114, 214 into the pocket 18 and fastening the screw 74.

A method of indexing an undersized insert 14, 114, 214 (usually due to a worn cutting edge) with the magnetic positioning tool 16, 116, 216, 316 can include the following steps:
 a. Attaching the magnetic holding surface 28 to an exposed, or accessible, main relief surface 172, or a side abutment surface 253 associated with an operative, usually worn, main cutting edge 58, 158, 258;
 b. unscrewing the screw 74 to unclamp, or release, the undersized insert 14, 114, 214;
 c. attaching the magnetic tool 16, 116, 216, 316 to the insert 14, 114, 214;
 d. removing the insert 14, 114, 214 from the pocket 18 and indexing it such that a non-used main relief surface 172, 272 is attached to the insert holding surface 28;
 e. Inserting the undersized insert 14 into the pocket 18 and fastening the screw 74.

What is claimed is:

1. An undersized indexable cutting insert (14, 114, 214) being devoid of a through bore; the cutting insert (14) comprising:
 opposite insert top and bottom surfaces (48, 148, 248, 50) and an insert peripheral surface (52) which extends therebetween, the insert top surface having a top edge (54);
 exactly three main cutting edges (58, 158, 258);
 an abutment protrusion (55) which extends outwardly from the top surface (48), beyond the top edge (54) in a side view of the insert, the abutment protrusion being three-sided in a plan view of the insert top surface (54);
 a top abutment surface (68) formed on top of the abutment protrusion (55) and configured for abutting engagement with a clamping screw (74), the top abutment surface (68) comprising a plurality of top abutment sub-surfaces (76), one of which is non-triangular in the plan view of the insert top surface (54), the plurality of top abutment sub-surfaces (76) defining the perimeter of the top abutment surface (68); and
 a deflector (57) which extends from a main rake surface (170, 270) onto a side of the abutment protrusion (55), the deflector configured to deflect chips;
 wherein:
 the cutting insert (14, 114, 214) comprises an inscribed circle (IC) which tangentially contacts only and all main cutting edges (58, 158, 258); and wherein the inscribed circle (IC) has an inscribed circle diameter (ICD) of under 3.8 millimeters; and
 the cutting insert (14, 114, 214) is not made of polycrystalline diamond (PCD) or polycrystalline boron (PCB).

2. The cutting insert (14, 114, 214) according to claim 1, wherein the inscribed circle (IC) has an inscribed circle diameter (ICD) which ranges between 2.5 and 3.8 millimeters.

3. The cutting insert (14, 114, 214) according to claim 1, wherein the cutting insert (14, 114, 214) comprises:
 a symmetry central axis (CA) which passes through the insert top and bottom surfaces (48, 148, 248, 50); and
 a maximum insert thickness (MIT), measured parallel to the symmetry central axis (CA), and ranges between 1 and 2.5 millimeters.

4. The cutting insert (14, 114, 214) according to claim 1, wherein in the plan view of the insert top surface (48, 148, 248) the main cutting edge (58, 158, 258) has a main cutting edge length (CEL) which ranges between 2 and 4 millimeters.

5. The cutting insert (14, 114, 214) according to claim 1, wherein: the cutting insert (14, 114, 214) comprises:
 a symmetry central axis (CA) which passes through the top and bottom surfaces (48, 148, 248, 50), wherein the cutting insert (14) has 120 degree rotational symmetry about the symmetry central axis (CA).

6. The cutting insert (14, 114, 214) according to claim 1, wherein the bottom surface (50) has a bottom edge (80), and in the plan view of the insert top surface (48), no part of the bottom edge (80) is visible.

7. The cutting insert (14, 114, 214) according to claim 1, wherein the cutting insert (14, 114, 214) is single sided, positive, and the insert bottom surface (50) comprises a bottom edge (80) which is not configured for machining and does not comprise cutting edges.

8. The cutting insert (14, 114, 214) according to claim 1, wherein the cutting insert (14, 114, 214) is pressed-to-size and no portion or surface thereof is ground.

9. The cutting insert (14, 114, 214) according to claim 1, wherein the cutting insert is made of cemented carbide.

10. The cutting insert (14, 114, 214) according to claim 1, wherein the cutting insert is made of tungsten carbide.

11. The cutting insert (14, 114, 214) according to claim 1, wherein:
 the top abutment surface (68) includes exactly three non-triangular top abutment sub-surfaces (76) configured for engagement with the screw (74).

12. The cutting insert (14, 114, 214) according to claim 1, wherein the bottom surface (50) has a smaller footprint than the top surface (48, 148, 248).

13. The cutting insert (14, 114, 214) according to claim 1, wherein, in the plan view of the insert top surface (48, 148, 248), an orientation of the top abutment surface (68) is rotated about a symmetry central axis (CA) with respect to the insert top surface (48).

14. The cutting insert (14, 114, 214) according to claim 1, wherein each of said plurality of top abutment sub-surfaces (76) protrudes beyond the top edge (54) in said side view of the insert.

15. The cutting insert (14, 114, 214) according to claim 1, wherein:
 a symmetry central axis (CA) passes through the insert top and bottom surfaces (48, 148, 248, 50);
 the top abutment surface (68) is non-planar; and
 the plurality of top abutment sub-surfaces (76) are circumferentially sloped relative to the symmetry central axis (CA), and separated from one another by a radially extending step discontinuity characterized by a difference in height of opposing radially extending edges belonging to circumferentially adjacent top abutment sub-surfaces (76).

16. A cutting tool (12) comprising exactly two insert pockets (18) and one cutting insert (14, 114, 214) according to claim 1 respectively retained in each of the exactly two insert pockets.

17. The cutting tool (12) according to claim 16, wherein the cutting tool (12) comprises a fluid channel (96) which opens out to each of the insert pockets (18) at a fluid outlet (98).

18. A method of indexing the undersized, bore-less indexable cutting insert (14, 114, 214) in accordance with claim 1, externally secured to an insert pocket (18) of a cutting tool (10) by the clamping screw (74), the method comprising:
   a. providing a positioning tool (16, 116, 216, 316) having an insert holding surface (28);
   b. contacting an exposed, or accessible, main relief surface (172), or a side abutment surface (253) associated with an operative one of the plurality of main cutting edges (58, 158, 258) of the cutting insert, with the insert holding surface (28) to thereby retain the cutting insert (14, 114, 214);
   c. unscrewing the clamping screw (74) to release the cutting insert (14) from the insert pocket (18);
   d. removing the cutting insert (14, 114, 214) from the insert pocket (18) with the positioning tool (16, 116, 216, 316) and indexing the cutting insert (14, 114, 214) by hand such that a main relief surface (72, 172, 272) of an unused one of the plurality of main cutting edges is attached to, and retained by, the insert retaining surface (28);
   e. inserting the indexed cutting insert (14, 114, 214) into the insert pocket (18) with the positioning tool (16, 116, 216, 316); and
   f. fastening the clamping screw (74) to secure the cutting insert (14, 114, 214) to the insert pocket (18).

19. An undersized, indexable single-sided cutting insert (14, 114, 214) being devoid of a through bore; the cutting insert comprising:
   opposite insert top and bottom surfaces (48, 148, 248, 50) and an insert peripheral surface (52) which extends therebetween, the insert top surface having a top edge (54);
   a symmetry central axis (CA) which passes through the top and bottom surfaces, and around which the cutting insert has 120 degree rotational symmetry; and
   exactly three main cutting edges (58, 158, 258); wherein:
   the cutting insert is not made of polycrystalline diamond (PCD) or polycrystalline boron (PCB);
   the cutting insert comprises an inscribed circle (IC) which tangentially contacts only and all main cutting edges, the inscribed circle (IC) having an inscribed circle diameter (ICD) of under 3.8 millimeters;
   the insert top surface (48, 148, 24) comprises an abutment protrusion (55) which extends outwardly from the top surface (48), beyond the top edge (54) in a side view of the insert, the abutment protrusion being three-sided in a plan view of the insert top surface (54);
   a top abutment surface (68) is formed on top of the abutment protrusion (55), the top abutment surface (68) comprising exactly three top abutment sub-surfaces (76) one of which is non-triangular in the plan view of the insert top surface, each top abutment sub-surface configured for abutting engagement with a clamping screw (74), the plurality of top abutment sub-surfaces (76) defining the perimeter of the top abutment surface (68);
   a deflector (57) extends from a main rake surface (170, 270) onto a side of the abutment protrusion (55), the deflector configured to deflect chips;
   the bottom surface (50) has a smaller footprint than the top surface (48, 148, 248); and
   the bottom surface (50) includes a planar bottom abutment surface (78).

20. The single-sided cutting insert (14, 114, 214) according to claim 19, further comprising a ramping cutting edge (162, 262) connected to each main cutting edge (158, 258) by a minor corner cutting edge (166).

21. The single-sided cutting insert (14, 114, 214) according to claim 19, wherein the bottom surface (50) includes a recess located centrally in the bottom abutment surface (78).

22. The cutting insert (14, 114, 214) according to claim 19, wherein the top abutment surface (68) comprises exactly three non-triangular top abutment sub-surfaces (76).

23. The cutting insert (14, 114, 214) according to claim 19, wherein each of said exactly three top abutment sub-surfaces (76) protrudes beyond the top edge (54) in said side view of the insert.

24. The cutting insert (14, 114, 214) according to claim 19, wherein:
   the top abutment surface (68) is non-planar; and
   all three of the top abutment sub-surfaces (76) are circumferentially sloped relative to the symmetry central axis (CA), and separated from one another by a radially extending step discontinuity characterized by a difference in height of opposing radially extending edges belonging to circumferentially adjacent top abutment sub-surfaces (76).

25. An undersized indexable cutting insert (14, 114, 214) being devoid of a through bore; the cutting insert (14) comprising:
   opposite insert top and bottom surfaces (48, 148, 248, 50) and an insert peripheral surface (52) which extends therebetween, the insert top surface having a top edge (54);
   exactly three main cutting edges (58, 158, 258) associated with the top edge (54);
   a symmetry central axis (CA) which passes through the insert top and bottom surfaces (48, 148, 248, 50); and
   an abutment protrusion (55) having a top abutment surface (68) formed on top of the abutment protrusion (55), the top abutment surface (68) configured for abutting engagement with a clamping screw (74); wherein:
   the top abutment surface (68) is non-planar and comprises a plurality of top abutment sub-surfaces (76);
   the plurality of top abutment sub-surfaces (76) are circumferentially sloped relative to the symmetry central axis (CA) and separated from one another by a radially extending step discontinuity characterized by a difference in height of opposing radially extending edges belonging to circumferentially adjacent top abutment sub-surfaces (76); and
   the cutting insert (14, 114, 214) comprises an inscribed circle (IC) which tangentially contacts only and all main cutting edges (58, 158, 258) and has an inscribed circle diameter (ICD) of under 3.8 millimeters.

26. The cutting insert (14, 114, 214) according to claim 25, wherein:

the abutment protrusion (55) extends outwardly from the top surface (48), beyond the top edge (54), in a side view of the insert; and the plurality of top abutment sub-surfaces (76) all protrude beyond the top edge (54), in said side view of the insert.

27. The cutting insert (14, 114, 214) according to claim 26, wherein:

the abutment protrusion (55) is three-sided, in a plan view of the insert top surface (54).

28. The cutting insert (14, 114, 214) according to claim 27, wherein:

one of the plurality of top abutment sub-surfaces (76) has a non-triangular shape, in said plan view of the insert top surface (54).

29. The cutting insert (14, 114, 214) according to claim 28, wherein:

the plurality of top abutment sub-surfaces (76) all have a non-triangular shape, in said plan view of the insert top surface (54).

30. The cutting insert (14, 114, 214) according to claim 26, wherein:

the abutment protrusion (55) is three-sided, in a plan view of the insert top surface (54).

31. The cutting insert (14, 114, 214) according to claim 26, wherein:

one of the plurality of top abutment sub-surfaces (76) has a non-triangular shape, in said plan view of the insert top surface (54).

32. The cutting insert (14, 114, 214) according to claim 26, wherein:

the plurality of top abutment sub-surfaces (76) all have a non-triangular shape, in said plan view of the insert top surface (54).

33. An indexable cutting insert (14, 114, 214) being devoid of a through bore; the cutting insert (14) comprising:

opposite insert top and bottom surfaces (48, 148, 248, 50) and an insert peripheral surface (52) which extends therebetween, the insert top surface having a top edge (54);

exactly three main cutting edges (58, 158, 258) associated with the top edge (54);

a symmetry central axis (CA) which passes through the insert top and bottom surfaces (48, 148, 248, 50); and an abutment protrusion (55) having a top abutment surface (68) formed on top of the abutment protrusion (55), the top abutment surface (68) configured for abutting engagement with a clamping screw (74);

wherein:

the top abutment surface (68) is non-planar and comprises a plurality of top abutment sub-surfaces (76);

the plurality of top abutment sub-surfaces (76) are circumferentially sloped relative to the symmetry central axis (CA) and separated from one another by a radially extending step discontinuity characterized by a difference in height of opposing radially extending edges belonging to circumferentially adjacent top abutment sub-surfaces (76); and the cutting insert (14, 114, 214) comprises an inscribed circle (IC) which tangentially contacts only and all main cutting edges (58, 158, 258).

34. The cutting insert (14, 114, 214) according to claim 33, wherein:

the inscribed circle (IC) has an inscribed circle diameter (ICD) which ranges between 2.5 and 3.8 millimeters.

* * * * *